United States Patent
Tanaka

(10) Patent No.: US 7,150,930 B2
(45) Date of Patent: Dec. 19, 2006

(54) POWER SUPPLY SYSTEM AND OPERATING METHOD THEREOF

(75) Inventor: Koichi Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 619 days.

(21) Appl. No.: 10/415,869

(22) PCT Filed: Aug. 7, 2002

(86) PCT No.: PCT/JP02/08084

§ 371 (c)(1),
(2), (4) Date: May 2, 2003

(87) PCT Pub. No.: WO03/021703

PCT Pub. Date: Mar. 13, 2003

(65) Prior Publication Data

US 2004/0038101 A1     Feb. 26, 2004

(30) Foreign Application Priority Data

Sep. 3, 2001    (JP) ............................. 2001-265227
Jun. 13, 2002   (JP) ............................. 2001-172737

(51) Int. Cl.
*H01M 4/00* (2006.01)
(52) U.S. Cl. ......................................... 429/27; 429/27
(58) Field of Classification Search .................. 429/27
See application file for complete search history.

(56) References Cited

U.S. PATENT DOCUMENTS 6,444,338 B1 * 9/2002 Araki et al. .................. 429/24
6,495,290 B1 * 12/2002 Hinokuma et al. ...... 429/231.8
6,926,983 B1 * 8/2005 Brambilla et al. ............ 429/26

FOREIGN PATENT DOCUMENTS

| EP | 0 702 376 | 3/1996 |
|---|---|---|
| EP | 0 731 519 | 9/1996 |
| JP | 6-274233 | 9/1994 |
| JP | 8-249923 | 9/1996 |
| JP | 9-251857 | 9/1997 |
| JP | 10-69817 | 3/1998 |
| JP | 11-203936 | 7/1999 |
| JP | 11-339820 | 12/1999 |
| JP | 2000-357524 | 12/2000 |
| WO | WO 01/60519 | 8/2001 |

* cited by examiner

Primary Examiner—Dah-Wei Yuan
Assistant Examiner—Ben Lewis
(74) Attorney, Agent, or Firm—Bell, Boyd & Lloyd LLC

(57) ABSTRACT

A power supply system capable of obtaining a high output with a good startability even in an extremely low humidity atmosphere. The power supply system includes a hybrid structure of a humidified type fuel cell unit using as an electrolyte a humidified type proton conductor having a proton conductive function in a humidified state and a low-grade humidified type fuel cell unit using as an electrolyte a low-grade humidified type proton conductor developing a proton conductive function in a humidified state lower than the above-mentioned humidified state. At the time of initial start-up, at least the low-grade humidified type fuel cell unit is operated, and then only the humidified type fuel cell unit is operated. At the time of initial start-up, moisture generated in the low-grade humidified type fuel cell unit is supplied to the electrolyte of the humidified type fuel cell unit.

9 Claims, 10 Drawing Sheets

POWER SUPPLY SYSTEM AND OPERATING METHOD THEREOF

CROSS REFERENCES TO RELATED APPLICATIONS

The present application claims priority to Japanese Patent Document No. P2001-265227 filed on Sep. 3, 2001, the disclosure of which is herein incorporated by reference.

BACKGROUND OF THE INVENTION

The present invention relates to a power supply system. More specifically, the present invention relates to a power supply system including a hybrid structure of a humidified type fuel cell and a low-grade humidified type fuel cell (non-humidified type fuel cell), and to a method of operating the power supply system.

A fuel cell is a device for allowing a power generator to generate an electromotive force by supplying hydrogen as a fuel gas and oxygen (air) thereto. In general, a fuel cell has a structure that an electrolyte film (proton conductive film) is held between gas electrodes, wherein the fuel cell is operated to obtain a desired electromotive force. Such a fuel cell is greatly expected to be applied to electric cars and hybrid type vehicles. In addition to the applications mounted on vehicles such as cars, they are now being studied to be applied to new applications different from those of existing dry cells and chargeable batteries by making effective use of an advantage of the fuel cell in terms of easy reduction in weight and size.

In general, the above-described fuel cell is typically classified based on the type of electrolytes used therefore, into a humidified type fuel cell group and a low-grade humidified (or non-humidified) type fuel cell group. Each of the humidified type fuel cell and the low-grade humidified type fuel cell has a disadvantage as well as an advantage. For example, the humidified type fuel cell can be difficult to initiate operations unless moisture is contained in outside air to some extent at the time of initial start-up because a proton conductive function of an electrolyte film of the fuel cell becomes effective only when moisture in outside air and/or moisture generated by power generating reaction are incorporated in the electrolyte film. With respect to the low-grade humidified type fuel cell (non-humidified type fuel cell), this can be started even in an extremely low humidity atmosphere, for example, at a sub-freezing temperature because the fuel cell uses an electrolyte film having a proton conductive film essentially requiring little moisture. The low-grade humidified type fuel cell, however, is difficult to be used on its own for applications requiring a large output because the electrolyte film of the fuel cell tends to be poorer in electric conductivity than the electrolyte film, having a conductive passage mainly composed of moisture, of the humidified type fuel cell.

A need, therefore, exists to provide an improved power supply system, such as a power supply system which is capable of obtaining a high output even in an extremely low temperature and low humidity atmosphere, and which is thereby suitable for portable equipment required to be operable in a wide temperature range from a sub-freezing temperature to a high temperature, and to provide a method of operating the power supply system.

SUMMARY OF THE INVENTION

According to an embodiment of the present invention, there is provided a power supply system including a humidified type fuel cell unit that employs as an electrolyte a humidified type proton conductor that has a proton conductive function in a humidified state, and a low-grade humidified type fuel cell unit that uses as an electrolyte a low-grade humidified proton conductor developing a proton conductive function in a humidified state lower than the above-mentioned humidified state. According to an embodiment of the present invention, there is also provided a method of operating a power supply system including a humidified type fuel cell unit using as an electrolyte a humidified type proton conductor having a proton conductive function in a humidified state, and a low-grade humidified type fuel cell unit using as an electrolyte a low-grade humidified proton conductor developing a proton conductive function in a humidified state lower than the above-mentioned humidified state. The method includes the steps of operating at least the low-grade humidified fuel cell unit at the time of the initial start-up, and operating only the humidified type fuel cell unit after the initial start-up.

According to an embodiment of the present invention, the low-grade humidified type fuel cell unit is operated at the time of start-up, to compensate for a low output characteristic of the humidified type fuel cell unit at the time of start-up. The low-grade humidified type fuel cell unit, particularly, the non-humidified type fuel cell unit uses an electrolyte film having a proton conductive mechanism essentially requiring little moisture, and as a consequence, it can be started even in an extremely low humidity atmosphere, for example, at a sub-freezing temperature. At the same time, moisture generated in the low-grade humidified type fuel cell is supplied to the humidified type fuel cell unit, to promote the self-humidification of the humidified type fuel cell. As a result, the humidified type fuel cell unit can develop its intrinsic high power generation ability, whereby the power supply system can obtain a high output by the humidified type fuel cell unit after the start-up.

Additional features and advantages of the present invention are described in, and will be apparent from, the following Detailed Description of the Invention and the figures.

DETAILED DESCRIPTION OF THE INVENTION

Hereinafter, a power supply system and an operating method thereof, to which the present invention is applied, will be described in detail with reference to the drawings.

Figure 1:
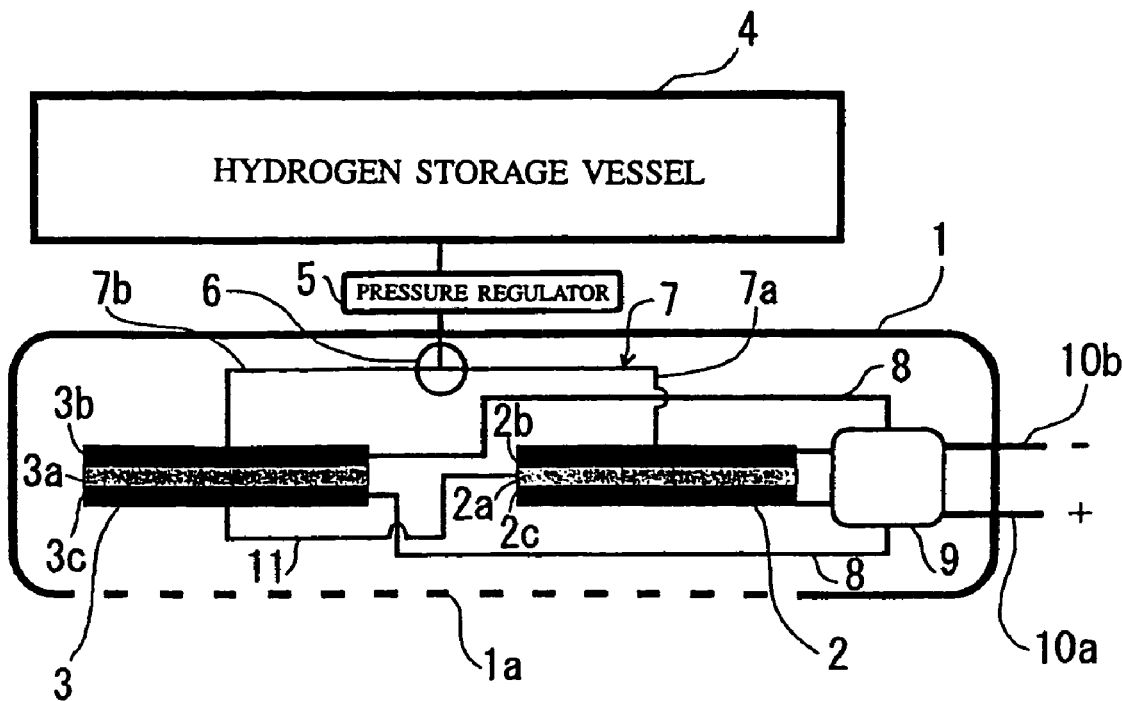
FIG. 1 is a schematic view of a power supply system according to an embodiment of the present invention.

A power supply system of an embodiment of the present invention is a power generation module including a hybrid structure of a humidified type fuel cell and a low-grade humidified type (non-humidified type) fuel cell, and is configured, as shown in FIG. 1, to have both a humidified type fuel cell unit 2 and a low-grade humidified type fuel cell unit 3 accommodated in a housing 1.

The fuel cell unit 2 is composed of an electrolyte 2a, a fuel electrode 2b joined to one surface of the electrolyte 2a, and an air electrode 2c joined to the other surface of the electrolyte 2a, and similarly, the fuel cell unit 3 is composed of an electrolyte 3a, a fuel electrode 3b joined to one surface of the electrolyte 3a, and an air electrode 3c joined to the other surface of the electrolyte 3a. The housing 1 has, for example, in its bottom surface, a number of air supply holes 1a to allow air (oxygen) to be introduced in the housing 1 through the air supply holes 1a and then supplied to the air electrodes 2c and 3c.

On the other hand, hydrogen is supplied as a fuel to the fuel electrodes 2b and 3b. The power supply system is provided with a hydrogen storage vessel 4 for storing hydrogen, and is also provided with a hydrogen supply line 7 for supplying hydrogen stored in the hydrogen storage vessel 4 to the fuel electrodes 2b and 3b of the humidified type fuel cell unit 2 and the low-grade humidified type fuel cell unit 3 via a pressure regulator 5 and a flow passage switch 6. The hydrogen supply line 7 includes a hydrogen supply passage 7a connected to the humidified type fuel cell unit 2 and a hydrogen supply passage 7b connected to the low-grade humidified type fuel cell unit 3, wherein the fuel cell unit to which hydrogen is to be supplied (that is, the fuel cell unit to be operated) can be selected by operating the flow passage switch 6. Of course, hydrogen can be supplied simultaneously to both the fuel cell units 2 and 3.

Outputs from the fuel cell units 2 and 3 are inputted to an output control line 9 via output paths 8, and are taken out from output terminals 10a and 10b. The low-grade humidified type fuel cell unit 3 is provided with an electrolyte film humidifying passage 11 for introducing moisture generated in the fuel cell unit 3 to the electrolyte 2a of the humidified type fuel cell unit 2.

Figure 2:
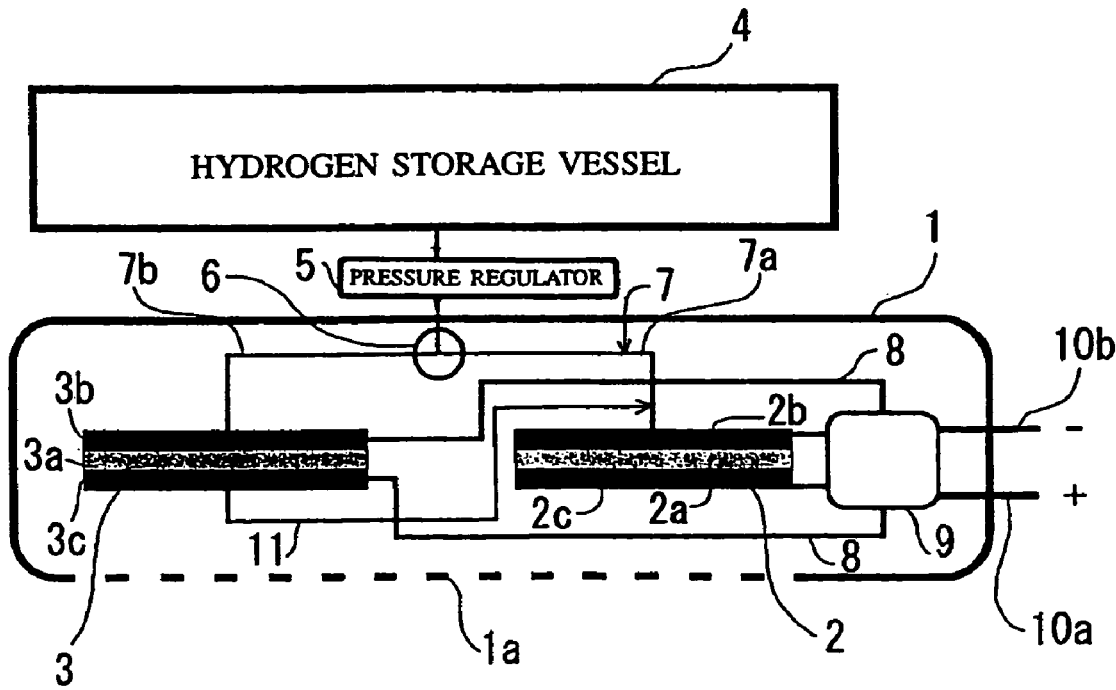
FIG. 2 is a schematic view of power supply system according to an embodiment of the present invention.

Moisture generated in the fuel cell unit 3 is not necessarily introduced directly to the electrolyte 2a of the humidified type fuel cell unit 2, but may be introduced indirectly to the electrolyte 2a via the hydrogen supply passage or oxygen supply passage of the humidified type fuel cell unit 2. FIG. 2 shows an example that moisture is introduced to the electrolyte 2a via the hydrogen supply passage 7a of the humidified type fuel cell unit 2, wherein the electrolyte humidifying passage 11 is connected to the hydrogen supply passage 7a of the humidified type fuel cell unit 2.

Figure 3:
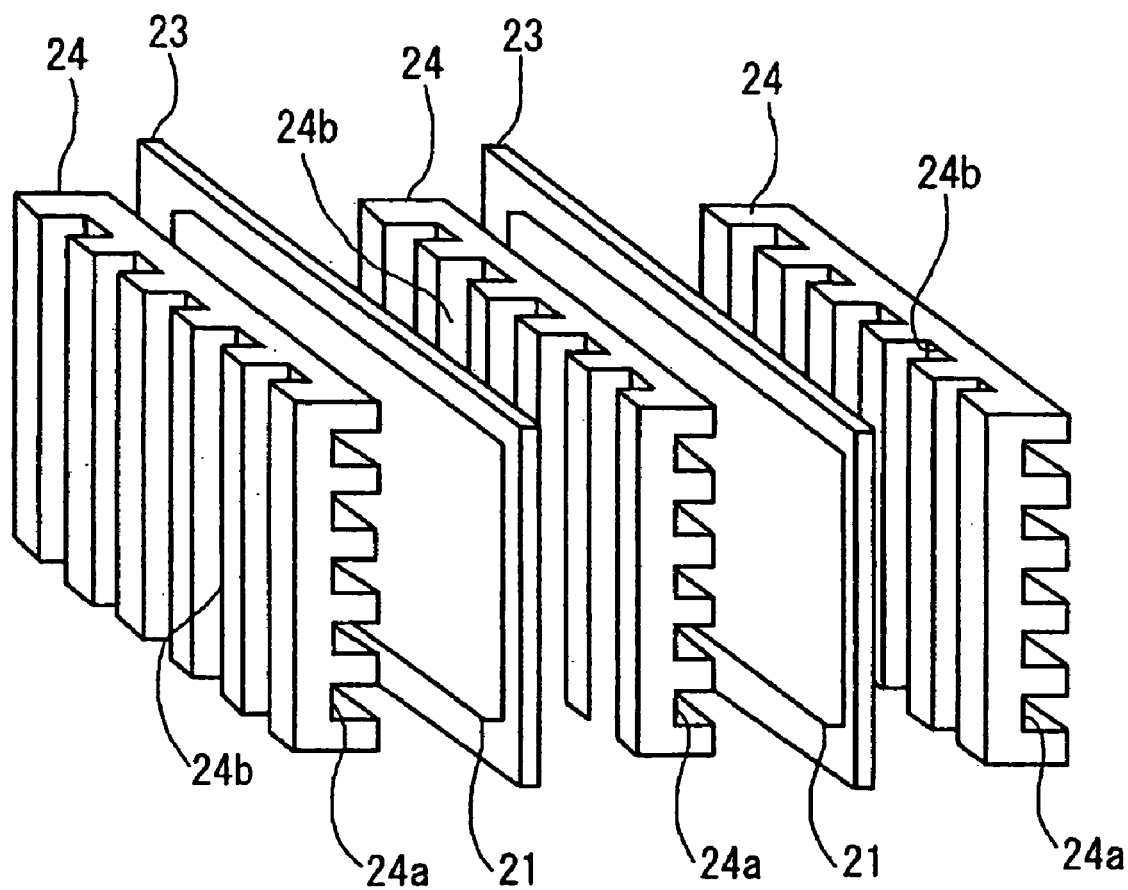
FIG. 3 is an exploded perspective view of a fuel cell according to an embodiment of the present invention.

A basic configuration of the fuel cell and a mechanism for generating an electromotive force from the fuel cell will be described below according to an embodiment of the present invention. As shown in FIG. 3, the fuel cell is configured such that a fuel electrode 21 in contact with hydrogen as a fuel gas is overlapped to an air electrode 22 in contact with air (oxygen) with an electrolyte 23 held therebetween, and such a sub-assembly is sandwiched between both current collectors 24. The current collector 24 is made from dense graphite which is high in current collecting performance and is stable in an oxidizing steam atmosphere. Horizontal grooves 24a to which hydrogen is to be supplied are formed in a surface, opposed to the fuel electrode 21, of the current collector 24, and vertical grooves 24b to which air is to be supplied are formed in a surface, opposed to the air electrode 22, of the current collector 24.

Figure 4:
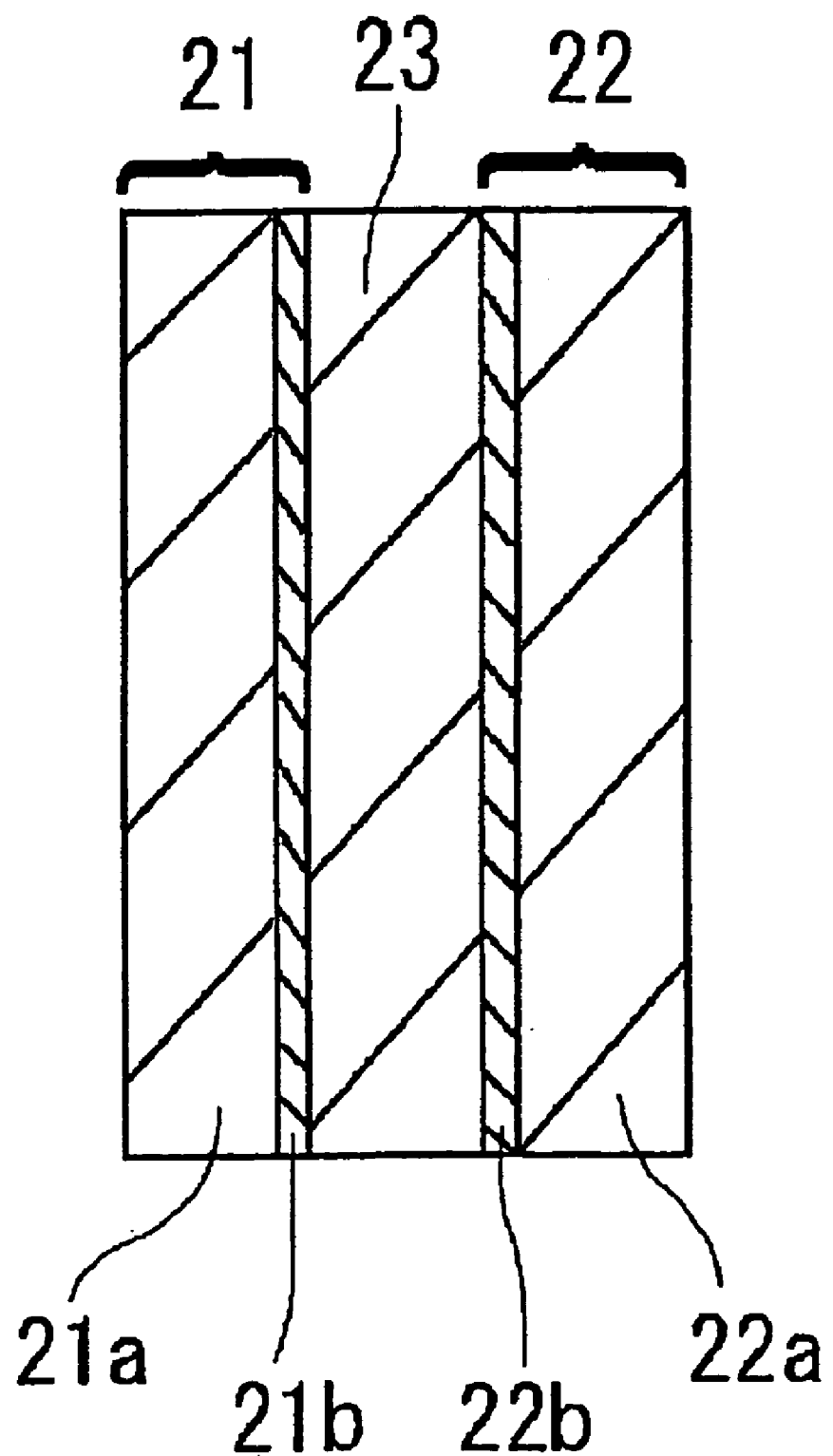
FIG. 4 is a schematic sectional view showing electrodes of the fuel cell according to an embodiment of the present invention.

As shown in FIG. 4, the fuel electrode 21 and the air electrode 22 are overlapped to each other with the electrolyte 23 held therebetween. The fuel electrode 21 is composed of a gas diffusion electrode 21a and a catalyst layer 21b, and similarly the air electrode 22 is composed of a gas diffusion electrode 22a and a catalyst layer 22b. Each of the gas diffusion electrodes 21a and 22a is made from a porous material, and each of the catalyst layers 21b and 22b is made from a mixture of an electrolyte and carbon particles which supports an electrode catalyst such as platinum.

A plurality of the fuel cells, which are taken as basic units, are stacked to each other in series into a fuel cell stack. Such a fuel cell is capable of outputting a specific voltage by operating the fuel cells as the basic units.

In the fuel cell having the above-described configuration, when hydrogen gas is supplied in the grooves 24a formed in the current collector 24 so as to be in contact with the fuel electrode 21 and air (oxygen) is supplied in the grooves 24b so as to be in contact with the air electrode 22, a reaction expressed by the following formula occurs on the fuel electrode 21 side.

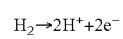

Further, a reaction expressed by the following formula occurs on the air electrode 22 side.

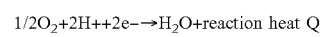

As a whole, a reaction expressed by the following formula occurs.

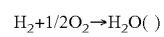

To be more specific, hydrogen is converted into protons by release of electrons on the fuel electrode 21 side. The protons migrate to the air electrode 22 side through the electrolyte 23, and react with electrons and oxygen on the air electrode 22 side. An electromotive force is generated on the basis of such an electrochemical reaction.

The humidified type fuel cell unit 2 and the low-grade humidified type fuel cell unit 3, whose basic configuration is as described above, are different from each other in terms of the kind of electrolyte used therefor. Each of the humidified type fuel cell unit 2 and the low-grade humidified type fuel cell unit 3 will be described below according to an embodiment of the present invention.

The humidified type fuel cell unit 2 will be first described. The humidified type fuel cell unit 2 is a fuel cell unit, which uses an electrolyte film substantially developing the proton conductivity thereof only when the electrolyte film is humidified with moisture in outside air or moisture generated during power generation, and which is thereby capable of obtaining a high output by humidification. The humidified type fuel cell unit 2, however, has an inconvenience that since the electrolyte develops the proton conductivity only when moisture in outside air or moisture generated during power generation is incorporated in the electrolyte, the humidified type fuel cell unit 2 cannot obtain a good startability unless moisture is contained in outside air to some extent. For example, in an extremely low humidity atmosphere, since a sufficient amount of moisture cannot be incorporated from outside air into the humidified type fuel cell unit, the humidified type fuel cell unit 2 can obtain minimal output. To cope with such an inconvenience, a method has been proposed of previously humidifying a fuel gas (hydrogen) to be supplied to a fuel cell by a humidifier; however, such a method presents another problem that the system for carrying out the method is enlarged and complicated.

Examples of humidified type proton conductors usable for the electrolyte film of the humidified type fuel cell unit 2 include a fluorocarbon resin based ion exchange film made from perfluoroalkyl sulfonate, a non-ester structure type fullerene such as a butyl sulfonate introduced fullerene, a hydrocarbon based ion exchange film, and/or the like. The fluorocarbon resin based ion exchange film is a polymer electrolyte film made from a polymer containing perfluoroalkyl chains having a high hydrophobic property as main chains to which side chains composed of perfluoroalkyl ether chains having a hydrophilic property and sulfonic acid groups bonded thereto are introduced. Such a fluorocarbon resin based ion exchange film is commercially available from de Pont de Nemours and Company under the trade name of "NAFION", W. L. Gore & Associates, Inc. under the trade name of "GORE-SELECT", Asahi Glass Company under the trade name of "FLEMION", and Asahi Kasei Corporation under the trade name of "ACIPLEX". The non-ester structure type fullerene is a fullerene as one kind of carbon clusters, to which functional groups, for example, each having a non-ester structure such as butyl sulfonate are introduced. The carbon cluster is an aggregated (collected) body formed by bonding or aggregating carbon atoms of the number of several to several hundreds. The aggregated (collected) body of carbon atoms makes it possible to improve the proton conductivity, and to ensure a sufficient film strength while keeping the chemical property and hence to facilitate film formation. The carbon cluster is not particularly limited in terms of carbon-to-carbon bonding, and further, it is not necessarily formed of 100% carbon atoms, but may contain other atoms. Examples of such carbon clusters include fullerenes represented by $C_{60}$, $C_{70}$, and $C_{82}$.

On the other hand, the low-grade humidified type fuel cell unit 3 uses as an electrolyte a low-grade humidified type proton conductor developing a proton conductive function in a humidified state lower than that necessary for the humidified proton conductor used for the above-described humidified type fuel cell unit 2. In particular, the low-grade humidified type fuel cell unit 2 is preferable to be configured as a non-humidified type fuel cell unit using as an electrolyte a non-humidified proton conductor essentially requiring little moisture and thereby developing a proton conductive function even in a non-humidified state. Since the non-humidified type fuel cell unit has the proton conductive mechanism essentially requiring no moisture, it can be instantly started in any dry atmosphere. The non-humidified type fuel cell unit, however, is difficult to be singly used for applications requiring a large output because the electrolyte thereof is poorer in proton conductivity than an electrolyte using a main conductive path composed of moisture.

Examples of low-grade humidified type proton conductors used for the electrolyte film of the low-grade humidified type fuel cell unit 3, particularly, non-humidified type proton conductors used for the electrolyte of the non-humidified type fuel cell unit include carbon clusters, to which functional groups capable of releasing protons are introduced, for example, an ester structure type fullerene such as a sulfonic acid introduced fullerene and an OH type fullerene, and also include a compound mainly containing silicon oxide and Brönsted acid, an acrylic acid based polymer having phosphoric acid groups, a solid inorganic acid compound, and an acid-base type hydrocarbon based ion exchange film represented by a film made from a composite of a basic polymer and an inorganic acid such as sulfuric acid or phosphoric acid.

The ester structure type fullerene such as a sulfonic acid introduced fullerene is a fullerene as one kind of carbon clusters, to which an ester structure such as sulfonic acid is introduced, and the OH type fullerene is a fullerene to which OH groups are introduced. As described above, the carbon cluster is an aggregated (collected) body formed by bonding or aggregating carbon atoms of the number of several to several hundreds. The aggregated (collected) body of carbon atoms makes it possible to improve the proton conductivity, and to ensure a sufficient film strength while keeping the chemical property and hence to facilitate film formation. The carbon cluster is not particularly limited in terms of carbon-to-carbon bonding, and further, it is not necessarily formed of 100% carbon atoms, but may contain other atoms. Examples of such carbon clusters include fullerenes represented by $C_{60}$, $C_{70}$, and $C_{82}$.

The proton conductor represented by the above-described ester structure type fullerene or OH type fullerene basically contains, as a main component, a carbon cluster to which functional groups capable of releasing protons ($H^+$) (proton releasable groups) are introduced. In such a proton conductor, ion conductivity is developed by migration of protons via the proton releasable groups. Any type of carbon cluster is usable as the main component of the proton conductor; however, the carbon cluster used herein is required to have, after the proton releasable groups are introduced thereto, the ion conductivity larger than the electron conductivity.

The carbon cluster is generally an aggregated (collected) body formed by bonding or aggregating carbon atoms of the number of several to several hundreds. The aggregated (collected) body of carbon atoms makes it possible to improve the proton conductivity, and to ensure a sufficient film strength while keeping the chemical property and hence to facilitate film formation. The carbon cluster is not particularly limited in terms of carbon-to-carbon bonding, and further, it is not necessarily formed of 100% carbon atoms, but may contain other atoms. Examples of such carbon clusters include fullerenes represented by $C_{60}$, $C_{70}$, and $C_{82}$, fullerenes in each of which at least part of a fullerene structure has an open end, and tube-like carbonaceous materials (so-called carbon nanotubes). Since the SP2-bonded structure of a fullerene or nanotube partially contains an element of SP3-bonded structure, the fullerene or nanotube generally has no electron conductivity and is thereby preferable as the base body of the proton conductor.

Figure 5:
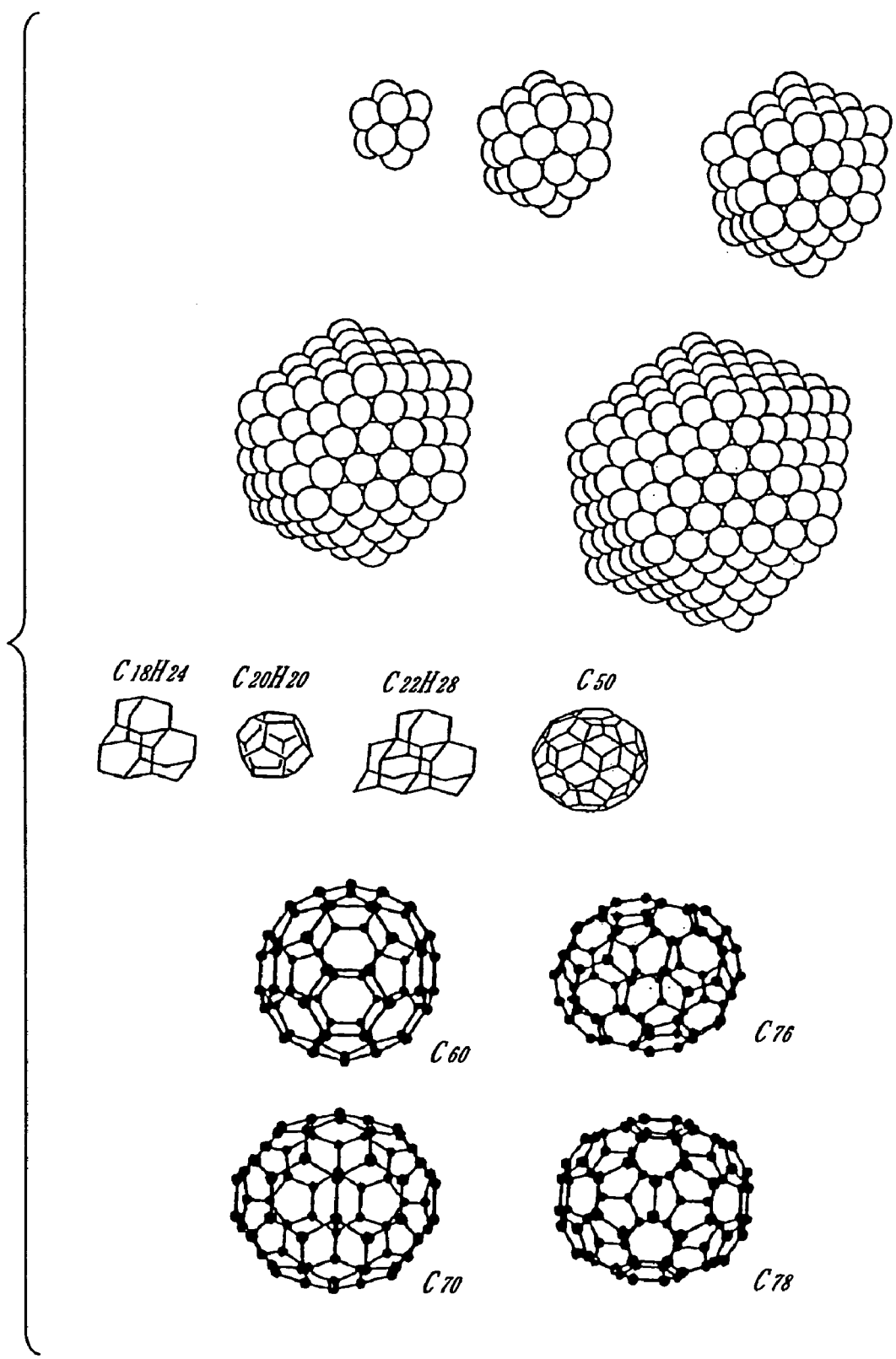
FIG. 5 is a schematic view showing various structural examples of carbon clusters as base bodies of electrolytes according to an embodiment of the present invention.
Figure 6:
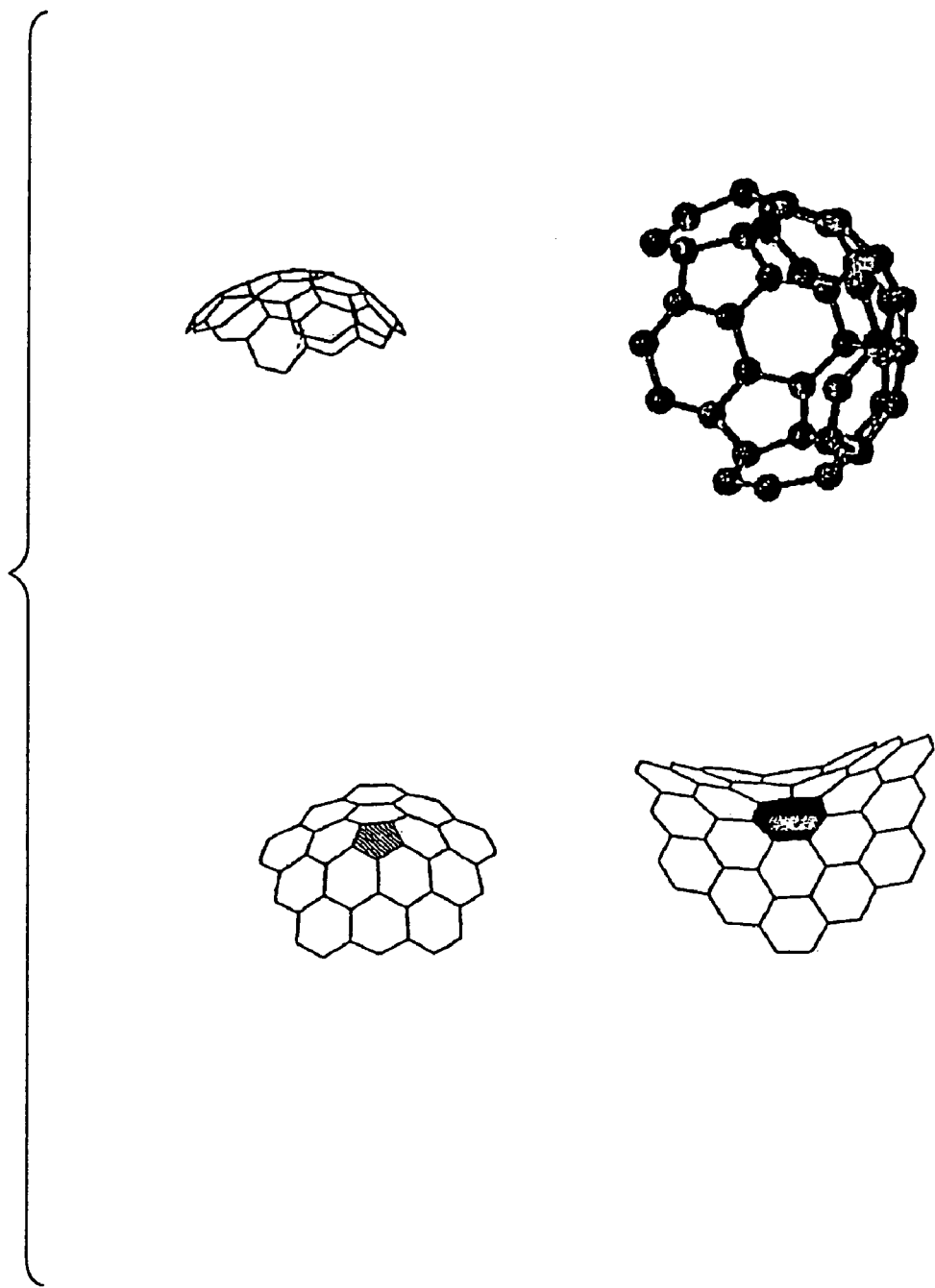
FIG. 6 illustrates further examples of carbon clusters (partial fullerene structures) according to an embodiment of the present invention.
Figure 7A:
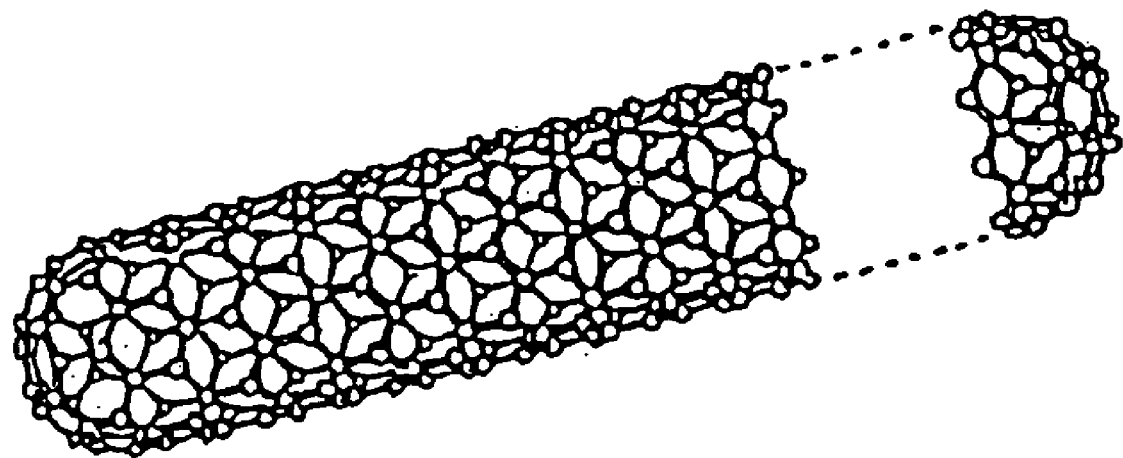
FIGS. 7A and 7B illustrate further examples of carbon clusters (tube-like carbonaceous materials) according to an embodiment of the present invention.
Figure 7B:
Figure 8:
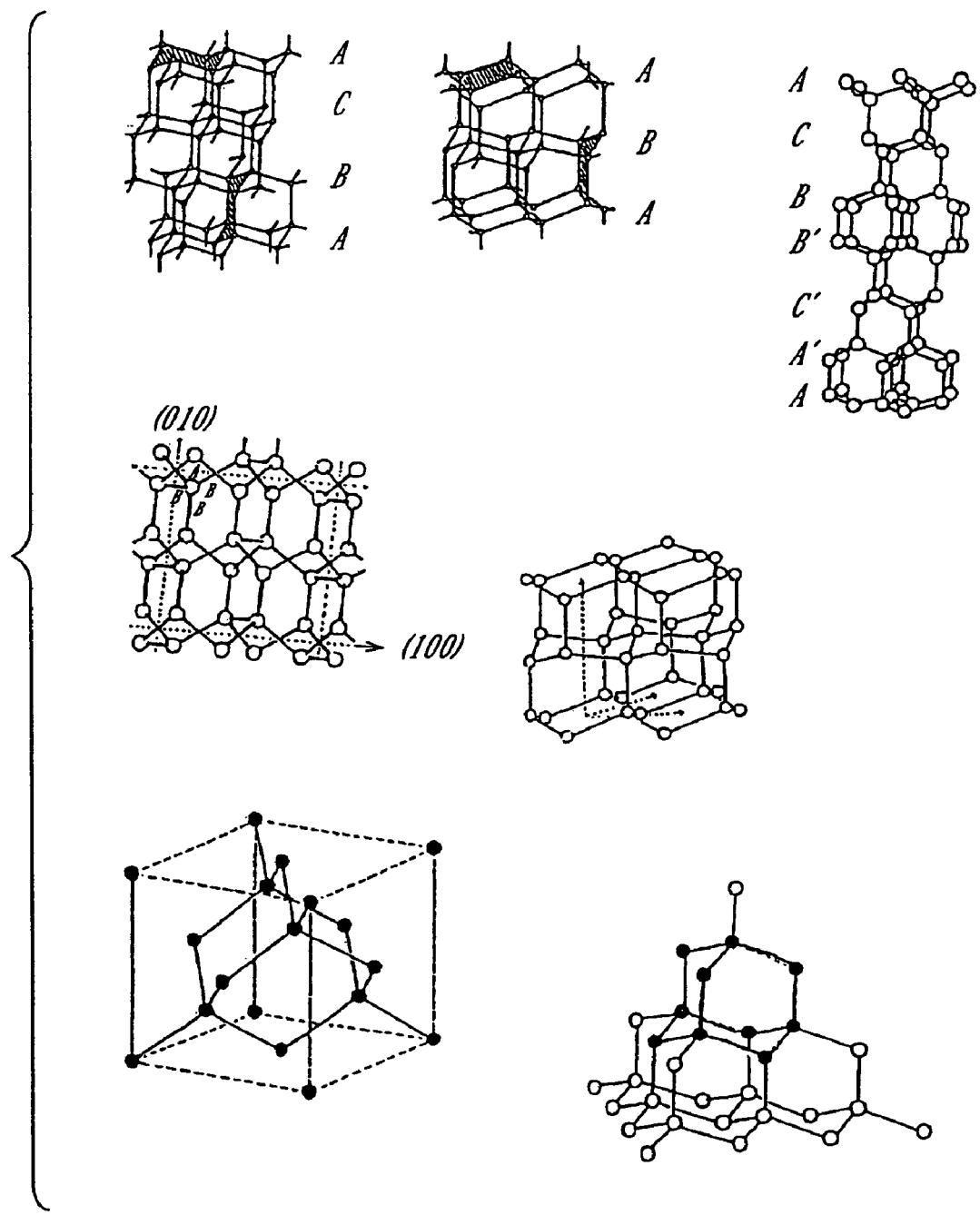
FIG. 8 illustrate further examples of carbon clusters (diamond structures) according to an embodiment of the present invention.
Figure 9:
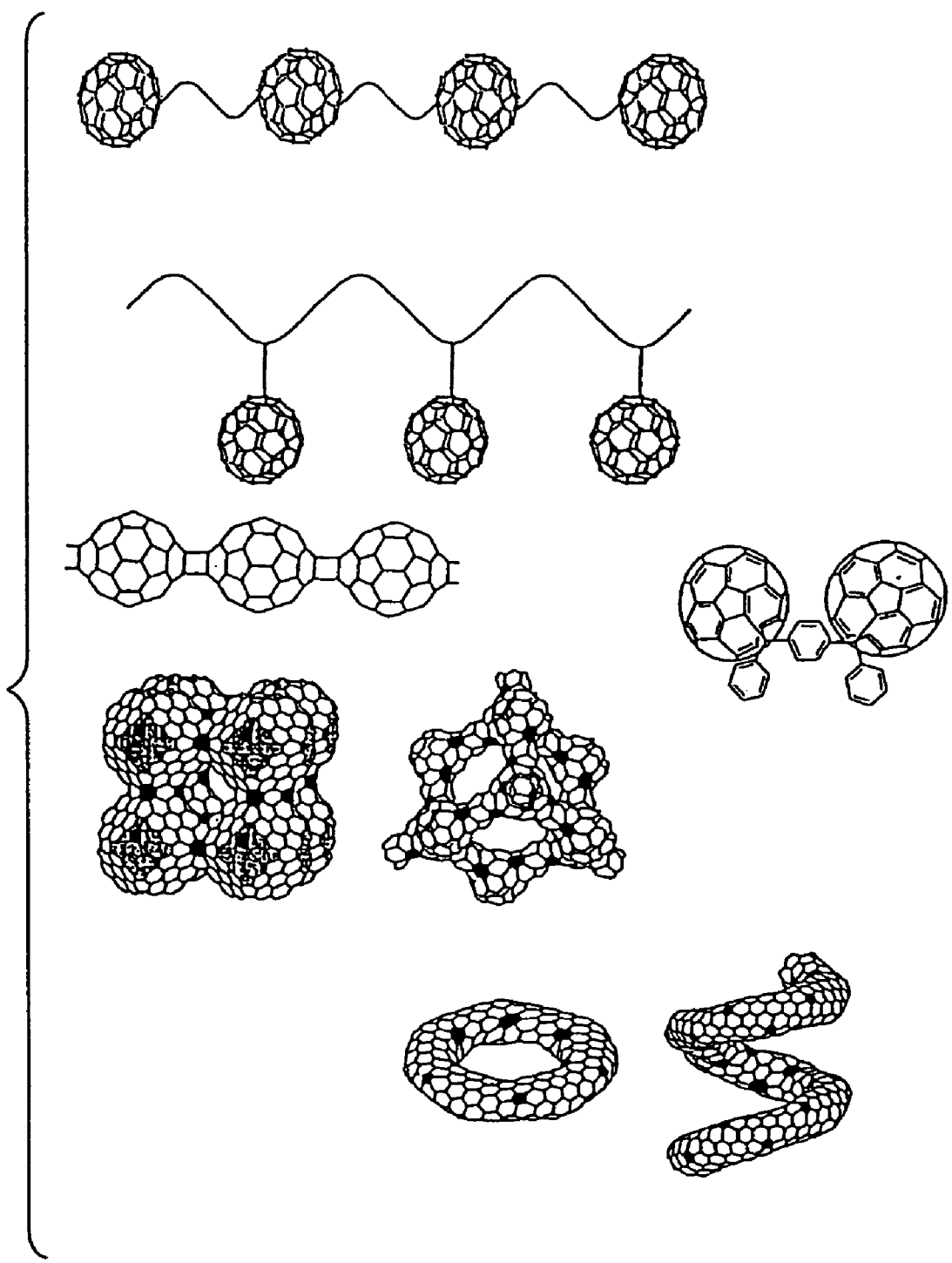
FIG. 9 illustrate further examples of carbon cluster groups (in each of which clusters are bonded to each other) according to an embodiment of the present invention.

FIG. 5 shows various carbon clusters formed by aggregating a number of carbon atoms, for example, spherical or spheroidal shaped carbon clusters, and carbon clusters having closed plane structures similar to the spherical or spheroidal structures according to an embodiment of the present invention. The above-described fullerene pertains to those shown in FIG. 5. FIG. 6 shows various carbon clusters in each of which part of the spherical structure is lost, wherein an open end is formed in the structure according to an embodiment of the present invention. Such a structure is mainly generated as a sub-product during production of fullerenes by arc discharge. FIGS. 7A and 7B show tube-like carbon clusters according to an embodiment of the present invention. The tube-like carbon clusters are typically classified into carbon nanotubes (CNTs) each having a diameter of several nanometers (nm) or less, typically, about 1 to about 2 nm, and carbon nanofibers (CNFs) each having a diameter of several nm or more and about 1 μm at maximum. In particular, the CNTs are further classified into single wall carbon nanotubes (SWCNTs) (see FIG. 7A) composed of single layer tubes and multi-wall carbon nanotubes (MWCNTs) (see FIG. 7B) composed of two or more layers overlapped concentrically. FIG. 8 shows various carbon clusters having a diamond structure in which most of carbon atoms have a SP3-bond structure according to an embodiment of the present invention. FIG. 9 shows carbon cluster groups, in each of which clusters are bonded to each other according to an embodiment of the present invention. Such a carbon cluster group is also usable as the base body of the proton conductor.

Examples of the functional groups capable of releasing protons ($H^+$) (proton releasable groups) to be introduced in a carbon cluster include a functional group having —$SO_3H$ or —$PO(OH)_2$, for example, a functional group expressed by —A—$SO_3H$ or —A—$PO(OH)_2$ (where A is either of O, R, O—R, R—O, and O—R—O, and R is an alkylene portion expressed by $C_xH_y$ ($1 \leq x \leq 20$, and $2 \leq y \leq 40$)), and a functional group expressed by —A'—$SO_3H$ or —A'—$PO(OH)_2$ (where A' is either of R', O—R', R'—O, R'—O—R", and O—R'—O, and each of R' and R" is an alkylene fluoride portion expressed by $C_xF_yH_z$ ($1 \leq x \leq 20$, $1 \leq y \leq 40$, and $0 \leq z \leq 39$).

The carbon cluster used herein may contain, in addition to the above-described functional group capable of releasing protons, an electron attracting group such as a nitro group, a carbonyl group, a carboxyl group, an aldehyde group, an alkoxycarbonyl group, a sulfonic acid group, a nitrile group, a halogenated alkyl group, and/or a halogen atom (fluorine or chlorine atom), more concretely, —$NO_2$, —CN, —F, —Cl, —COOH, —$COOR^O$, —CHO, —$CPR^O$, —$CF_3$, and/or —$SO_3CF_3$ (here, $R^O$ indicates an alkyl group). The presence of such an electron attracting group in combination with the proton releasable function group is advantageous in that protons are easy to be released from the proton releasable function group due to an electron attracting effect of the electron attracting group, and are thereby easy to migrate via the function group.

The number of the above-described functional groups to be introduced in the carbon cluster used herein may be suitably selected depending on the number of carbons constituting the carbon cluster, and as a preferred example, it may be set in a range of 5 or more. In the case of using a fullerene, to allow the π-electron characteristic of the fullerene to remain for obtaining an effective electron attracting characteristic, the number of the function groups is preferably set to a value being a half or less of the number of carbons constituting the fullerene.

The functional groups capable of releasing protons may be introduced in a carbon cluster by a manner of synthesizing the carbon cluster by arc discharge using a carbon based electrode, and subjecting the carbon cluster to acid treatment (using sulfuric acid), followed by a treatment such as hydrolysis, or subjecting the carbon cluster to sulfonation, phosphonating or the like. With this treatment, a carbon cluster derivative as a target product (carbon cluster having function groups capable of releasing protons) can be easily obtained.

For example, in the case of using an aggregated body of a number of fullerene derivatives each of which is obtained by introducing the above-described function groups to a fullerene as a carbon cluster, the proton conductivity of the fullerene derivatives in the form of a bulk or aggregated body is directly dependent on migration of protons released from a large amount of the function (for example, $OSO_3H$ groups) contained in molecules, with a result that the proton conductivity of the fullerene derivatives can be developed without the need of incorporation of hydrogen or protons originating from steam molecules in an external atmosphere, and accordingly, without the need of supply of moisture from external, particularly, absorption of moisture from outside air. The fullerene derivates, therefore, can develop the proton conductivity without any limitation to atmosphere. Since a large amount of function groups can be introduced in one fullerene molecule, the number density of protons contributing to conduction per unit volume of the conductor becomes very large. This is one reason why the proton conductor of the present invention develops an effective conductivity.

The fullerene as the base body of the derivative molecule has, in particular, an electrophillic property, which may be considered to greatly contribute to promotion of ionization of hydrogen ions in the function groups. The proton conduction may be considered to be due greatly to the introduced groups, and in the case of the fullerene derivative, the electric conduction via the contour may occur by the electrophillic property of the fullerene molecules. This is another reason why the proton conductor of the present invention exhibits the excellent proton conductivity.

Since most of the proton conductor is composed of carbon atoms of fullerene, it is lightweight, less altered, and relatively clean, and further it contains negligible, if any, contaminants capable of exerting adverse effect to the proton conductivity. In addition, the production cost of fullerenes is being rapidly lowered. From the viewpoints of resource, environment, economy, and the like, the fullerene is the most ideal carbon based material.

As described above, the carbon cluster having the proton releasable functional groups can realize a structure allowing protons to be easily dissociated and hopped between sites due to a structural property that a spatial density of the acidic function groups is high and an electronic property of the carbon cluster as the base body (for example, fullerene), and accordingly it can realize good proton conduction even in a dry state.

On the other hand, examples of the compounds (proton conductors) each mainly containing silicon oxide and Brönsted acid include a proton conductor composed of a compound mainly containing silicon oxide and Brönsted acid and a thermoplastic elastomer (see Japanese Patent Laid-open No. Hei 8-249923), a proton conductor composed of a compound mainly containing silicon oxide and Brönsted acid, and a polymer having sulfonic acid groups as side chains (see Japanese Patent Laid-open No. Hei 10-69817), and a proton conductor composed of a compound mainly containing silicon oxide and Brönsted acid, and a block copolymer produced by polymerizing conjugated diene units and aromatic vinyl units (see Japanese Patent Laid-open No. Hei 11-203936). Here, examples of the Brönsted acid includes phosphoric acid and its derivative and perchloric acid and its derivative. Silicon oxide has OH groups as terminal groups on the surface, wherein protons of the OH groups contribute to ion conduction. The addition of Brönsted acid to silicon oxide is advantageous in that Brönsted acid functions as a doner of protons, to bond the OH groups as terminal groups on the surface of silicon oxide at a high density. Protons of such OH groups cause hopping migration, so that the proton conductor develops a high proton conductivity even in a dry atmosphere.

The acrylic acid based polymer having a phosphoric acid group is a polymer obtained by polymerizing acrylic monomers having phosphoric acid groups (which monomers are typically commercially available from Unichemical Mfg., Ltd. under the trade name of PHOSMER) in a relatively mild atmosphere. The acrylic acid polymer can exhibit the proton conductivity at a high temperature even if it contains no moisture because the electric conductivity thereof is rapidly increased with an increase in temperature. The reason for this may be considered as follows. Namely, condensed or adsorbed moisture in the phosphoric acid groups is less desorbed, and consequently, in a high temperature region, the molecules of the condensed or adsorbed moisture contribute to proton conduction as the polymer electrolyte becomes plasticized. The acrylic acid polymer has another feature that the phosphoric acid group or phosphonic acid group less causes any desorbing reaction as compared with the sulfonic acid group, and thereby it has a higher resistance against radicals.

Examples of the above-described solid inorganic compounds include $CsHSO_4$ and $Rb_3H(SeO_4)_2$. Such a solid inorganic compound develops the proton conductivity even in a non-humidified state, and is stable even at a high temperature of 250° C. or more.

In the power supply system of the present invention, it is most preferable to combine the above-described humidified type fuel cell unit with the above-described non-humidified type fuel cell unit; however, the present invention is not limited thereto but may be configured to combine fuel cells relatively different from each other in terms of the humidified state necessary for the fuel cells. For example, with respect to the above-described proton conductors, the degrees of the need of humidification becomes lower in the order of the fluorocarbon resin based ion exchange film, the non-ester structure type fullerene, and the ester structure type fullerene. As a result, there may be adopted a combination of a fuel cell using the fluorocarbon resin based ion exchange film as an electrolyte (equivalent to the humidified type fuel cell) and a fuel cell using the ester structure type fullerene as an electrolyte (equivalent to the non-humidified type fuel cell), a combination of a fuel cell using the non-ester structure type fullerene as an electrolyte (equivalent to the humidified type fuel cell) and a fuel cell using the ester structure type fullerene as an electrolyte (equivalent to the non-humidified type fuel cell), and a combination of a fuel cell using the fluorocarbon resin based ion exchange film as an electrolyte (equivalent to the humidified type fuel cell) and a fuel cell using the non-ester structure type fullerene as an electrolyte (equivalent to the low-degree humidified fuel cell).

Figure 10:
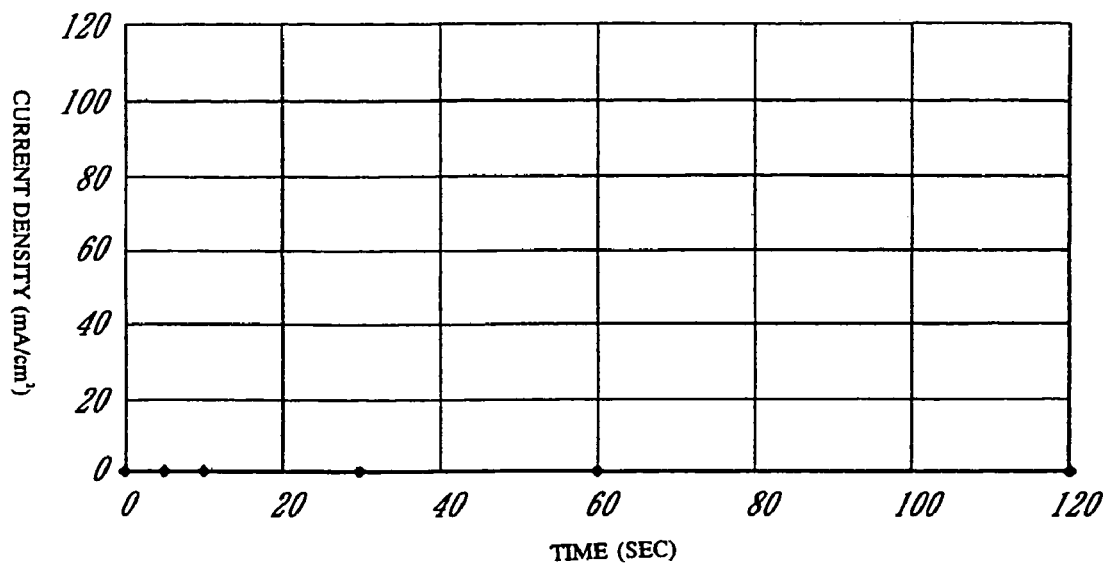
FIG. 10 is a characteristic diagram showing a low temperature startability of a humidified type fuel cell.

A method of operating the above-described power supply system will be described below according to an embodiment of the present invention. First, the low temperature startability of the humidified type fuel cell will be described below. In an extremely low humidity atmosphere, the humidified type fuel cell cannot receive moisture in an amount sufficient for power generation from outside air, thereby failing to obtain any output. FIG. 10 is a characteristic diagram showing the low temperature startability of the humidified type fuel cell. In this example, the output (current density) after 120 sec remains as 0 $mA/cm^2$. It is to be noted that the low temperature startability of the fuel cell was obtained by measuring the current density at a low voltage (0.7 V) under a condition with a temperature of −10° C. This applies in the following examples.

Figure 11:
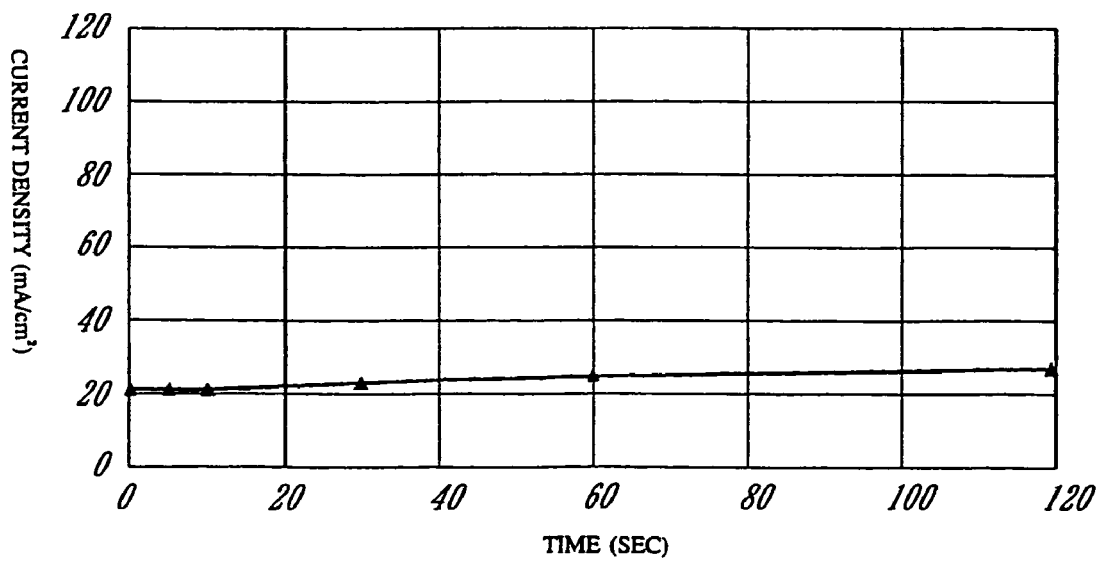
FIG. 11 is a characteristic diagram showing a low temperature startability of a non-humidified type fuel cell.

With respect to the low temperature startability of the non-humidified type fuel cell, as shown in FIG. 11, the non-humidified type fuel cell can instantly be started even in any dry atmosphere. In this example, it can obtain an output of about 20 $mA/cm^2$ immediately after start-up. The output, however, is then little changed and kept at a low level even after an elapse of 120 sec. The reason why the output is somewhat increased by power generation is that the conductivity of the electrolyte is increased by heat generation in the power generation unit, and that depending on the material of the proton conductor, the humidification due to moisture generated by reaction contributes to the increase in conductivity.

The power supply system in an embodiment of the present invention has the hybrid structure of the humidified type fuel cell portion 2 and the low-grade humidified (or non-humidified) type fuel cell unit 3. Accordingly, by selectively operating both the fuel cell units 2 and 3, it is possible to make effective use the advantages of both the fuel cell units 2 and 3, and hence to maximize the abilities of both the fuel cell units 2 and 3.

To be more specific, at the time of initial start-up, hydrogen is supplied to both the humidified type fuel cell unit 2 and the low-grade humidified type fuel cell unit 3, to operate both the fuel cell units 2 and 3. At this time, a low temperature startability can be obtained to some extent due to contribution of the output of the low-degree humidified type fuel cell unit 3. It is to be noted that the operation of the power supply system is not limited thereto. For example, only the low-degree humidified type fuel cell unit 3 may be operated at the time of initial start-up.

After start-up, self-humidification is promoted by moisture generated in the low-grade humidified type fuel cell unit 3, to increase the output of the humidified type fuel cell unit 2. The moisture generated in the low-grade humidified type fuel cell unit 3 passes through the electrolyte film humidifying passage 11, to be supplied to the electrolyte 2a of the humidified type fuel cell unit 2, thereby promoting the self-humidification. As the output of the humidified type fuel cell unit 2 is increased by the self-humidification, the output of the module is switched to the humidified type fuel cell unit 2 side by actuation of the output control line 9. At the same time, the hydrogen gas, which has been supplied to both the low-grade humidified type fuel cell unit 3 and the humidified type fuel cell unit 2 at the start-up, is switched to be supplied to only the humidified type fuel cell unit 2. After that, only the humidified type fuel cell unit 2 is operated.

Figure 12:
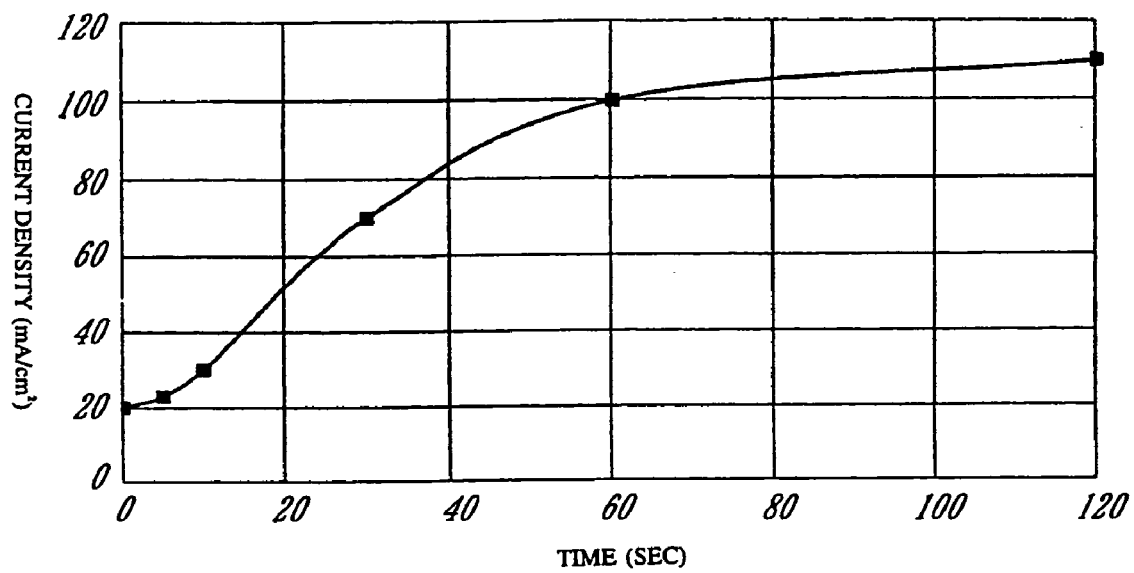
FIG. 12 is a characteristic diagram showing a low temperature startability of a power supply system which includes a hybrid structure of a humidified type fuel cell unit and a non-humidified type fuel cell unit according to an embodiment of the present invention.

Since the output of the low-grade humidified type fuel cell unit 3 at the start-up is thus smoothly switched to the output of the humidified type fuel cell unit 2 after start-up, a high output can be obtained from initial start-up even in an extremely low humidity atmosphere. FIG. 12 shows a low temperature startability of the power supply system according to an embodiment of the present invention including a hybrid structure of the humidified type fuel cell unit 2 and the low-grade humidified (non-humidified) type fuel cell unit 3. As is apparent from this graph, an output of about 20 $mA/cm^2$ can be obtained immediately after start-up, being rapidly increased, and is kept at a high value.

As is apparent from the above description, according to an embodiment of the present invention, a high output can be obtained even in an extremely low temperature and low humidity atmosphere. Accordingly, it is possible to provide a power supply system most suitable to be applied to a power supply for portable equipment required to be operated in a wide temperature range from a low temperature, for example, a below-freezing temperature to a high temperature, and to provide a method of operating the power supply unit.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A power supply system comprising:
   a first fuel cell unit including a first proton conductor with a first electrolyte that displays proton conductive properties in a first humidified state; and
   a second fuel cell unit including a second proton conductor with a second electrolyte that displays proton conductive properties in a second humidified state that is less humidified than the first humidified state, wherein the first proton conductor includes a material selected from the group consisting of a fluorocarbon resin-based ion exchange film, a non-ester structure type fullerene, a hydrocarbon based ion exchange film and mixtures thereof; and the second proton conductor contains a material selected from the group consisting of a carbon cluster to which a functional group capable of releasing protons is introduced, a compound mainly containing silicon oxide and Brönsted acid, an acrylic acid based polymer having a phosphoric acid group, a solid inorganic acid compound, an acid-base type hydrocarbon based ion exchange film and mixtures thereof.

2. The power supply system according to claim 1, wherein the second electrolyte displays proton conductive properties in a substantially non-humidified state.

3. The power supply system according to claim 1, wherein the carbon cluster is selected from the group consisting of an ester structure type fullerene, an OH type fullerene and mixtures thereof.

4. The power supply system according to claim 1, wherein the first proton conductor contains a non-ester structure type fullerene, and the second proton conductor is a non-humidified type proton conductor that contains a material selected from the group consisting of an ester structure type fullerene, an OH type fullerene and mixtures thereof.

5. The power supply system according to claim 1, further comprising a humidifying mechanism for supplying moisture generated in the second fuel cell unit to the electrolyte of the first fuel cell unit.

6. The power supply system according to claim 5, wherein the first fuel cell unit has a hydrogen supply passage and/or an oxygen supply passage, and moisture generated in the second fuel cell unit is indirectly supplied to the electrolyte of the first fuel cell unit via the hydrogen supply passage and/or oxygen supply passage.

7. The power supply system according to claim 1, further comprising a hydrogen supply mechanism for supplying hydrogen to the second fuel cell unit and the first fuel cell unit.

8. The power supply system according to claim 7, wherein the hydrogen supply mechanism has a flow passage switch for switching the first and second fuel cell units to one to which hydrogen is to be supplied wherein at the time of start-up, moisture generated in the second fuel cell unit is supplied to the first fuel cell unit.

9. A method of operating a power supply system including a first fuel cell unit including a first proton conductor with a first electrolyte that has proton conductive properties in a first humidified state, and a second fuel cell unit including a second proton conductor with a second electrolyte that has proton conductive properties in a second humidified state that is less humidified than the first humidified state, the method comprising the steps of:
   operating at least the second fuel cell unit at the time of initial start-up; and
   operating only the first fuel cell unit after initial start-up wherein at the time of start-up, moisture generated in the second fuel cell unit is supplied to the first fuel cell unit.

* * * * *